J. Thompson,
Boring Hubs,
Nº 33,012.    Patented Aug. 6, 1861.
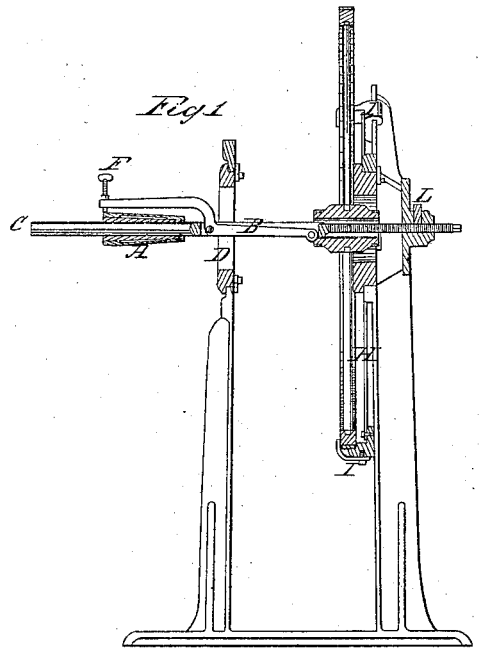
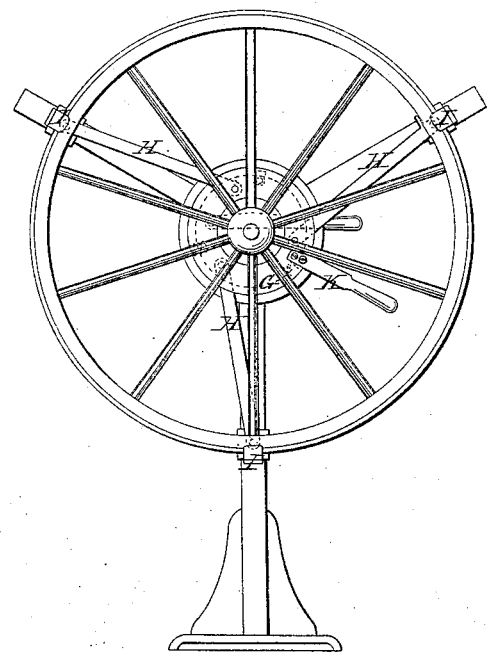
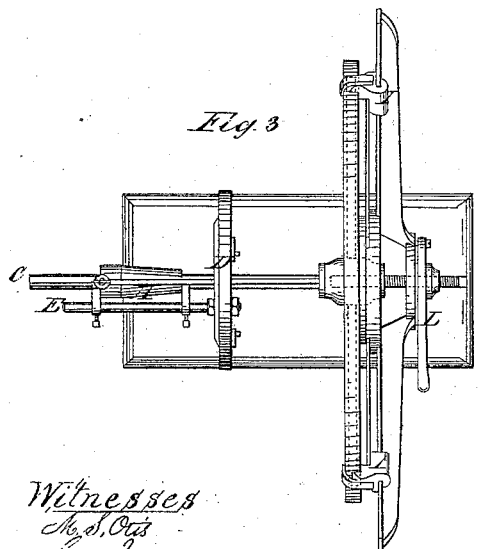
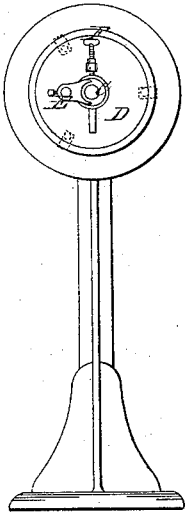
Witnesses
M. S. Otis
Geo. Sniddale
Inventor
John Thompson

UNITED STATES PATENT OFFICE.

JOHN THOMPSON, OF CLIFTON, NEW YORK.

MACHINE FOR BORING WAGON-HUBS.

Specification of Letters Patent No. 33,012, dated August 6, 1861.

*To all whom it may concern:*

Be it known that I, JOHN THOMPSON, of Clifton, Monroe county, and State of New York, have invented a new and useful Machine for Boring Wagon-Hubs and other Irregular Holes; and I declare the following is a full, complete, and exact description of the construction and operation of the same, reference being had to the annexed drawings, making a part of this specification.

Figure 1 is a vertical section, showing the position of the pattern A, on the boring arbor C, also the vibrating cutter bar B, with its center pin and set-screw. Also the disk D, with its slot through which the vibrating cutter bar slides as it is drawn through the hub by means of the screw on the boring arbor. Fig. 2 represents the tri-radiated frame work on which the jaws of the centering chuck slide marked I which are caused to move simultaneously by means of the center ring, to which they are attached by the connections H. The ring G being made to move by means of the lever K. Fig. 3 is a plan showing the arrangement of the dog rod E which is made fast in the disk, the dogs are fastened upon the rod by means of set screws for the purpose of holding the pattern from sliding with the boring arbor. The nut lever L is also shown in this figure which when put in position causes the boring bar or arbor to feed forward through the work, but when raised out of connection with the screw, the arbor may be quickly drawn back. Fig. 4 represents the front view of the disk, with its slot, showing the shape of the dogs, also the ring in which the disk revolves.

All the parts above described are placed upon a suitable frame-work so that the centers may be kept firmly in line.

Having described the drawings and the important parts of my invention, its operation consists in putting the wheel or other work into the chuck, and making it fast by moving the ring around its axis by means of the lever, the boring arbor is then inserted through the hub with the vibrating cutter bar so as to bring the cutter to the work, the pattern is then put on the arbor with its out end at the screw in the cutter bar, the nut lever is then put in position with the screw on the arbor, the power is then applied to the arbor and as the cutter passes through the hub, the set-screw slides along the pattern producing a hole of corresponding shape.

What I claim and desire to secure by Letters Patent as my invention is:

1. The combination of the boring arbor C and its mortise with the vibrating cutter bar B working in the arbor as described.

2. The revolving disk, with its center opening and slot connected, also its combination with the dog rod and dogs.

JOHN THOMPSON.

Witnesses:
M. S. OTIS,
GEO. TRUESDALE.